United States Patent
Fan et al.

(10) Patent No.: US 10,530,634 B1
(45) Date of Patent: Jan. 7, 2020

(54) TWO-CHANNEL-BASED HIGH-AVAILABILITY

(71) Applicant: VMware, Inc., Palo Alto, CA (US)

(72) Inventors: Kai-Wei Fan, San Jose, CA (US); Haihua Luo, San Jose, CA (US); Stephen Tan, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/048,107

(22) Filed: Jul. 27, 2018

(51) Int. Cl.
| | |
|---|---|
| H04L 12/24 | (2006.01) |
| H04L 12/703 | (2013.01) |
| H04L 12/751 | (2013.01) |
| H04L 12/26 | (2006.01) |
| H04L 29/06 | (2006.01) |
| H04L 12/707 | (2013.01) |
| H04L 29/08 | (2006.01) |

(52) U.S. Cl.
CPC ...... H04L 41/0663 (2013.01); H04L 41/0668 (2013.01); H04L 43/0829 (2013.01); H04L 45/02 (2013.01); H04L 45/22 (2013.01); H04L 45/28 (2013.01); H04L 69/22 (2013.01); H04L 67/10 (2013.01)

(58) Field of Classification Search
CPC .......... H04L 41/0663; H04L 41/0668; H04L 43/0829; H04L 5/02; H04L 5/22; H04L 5/28; H04L 69/22; H04L 67/10
See application file for complete search history.

(56) References Cited

U.S. PATENT DOCUMENTS

| 10,250,562 B1 * | 4/2019 | Srinath ............... H04L 63/0263 |
| 2008/0186968 A1 | 8/2008 | Farinacci |
| 2008/0212483 A1 * | 9/2008 | Zhang ..................... H04L 45/00 370/244 |
| 2009/0154340 A1 | 6/2009 | Kumaresan |
| 2009/0285090 A1 * | 11/2009 | Allasia ................ H04L 12/2854 370/221 |
| 2010/0023632 A1 * | 1/2010 | Liu ..................... H04L 12/4633 709/230 |

(Continued)

OTHER PUBLICATIONS

D.Katz, RFC 5880 entitled "Bidirectional Forwarding Detection (BFD)" dated Jun. 2010, (49 pages).

*Primary Examiner* — Kevin D Mew
(74) *Attorney, Agent, or Firm* — Hickman Palermo Becker Bingham LLP; Malgorzata A. Kulczycka

(57) ABSTRACT

A method for providing two-channel-based high-availability in a cluster of nodes is disclosed. In an embodiment, a method comprises: initiating, by a local control plane executing on a first node, a first state for an underlay control channel and a second state for a management control channel; detecting a bidirectional forwarding detection ("BFD") control packet from a second node; determining whether the BFD control packet has been received from the underlay control channel; in response to determining that the BFD control packet was received from the underlay control channel: parsing the BFD control packet to extract a first diagnostic code; updating the first state with the first diagnostic code; determining whether both the first state and the second state indicate that the second node is unreachable; in response to determining that the second node is unreachable, initiating a switchover of services configured on the second node.

20 Claims, 7 Drawing Sheets

(56) References Cited

U.S. PATENT DOCUMENTS

| | | | |
|---|---|---|---|
| 2012/0155283 A1* | 6/2012 | Sanguineti | H04L 41/0226 370/241.1 |
| 2013/0322232 A1* | 12/2013 | Csaszar | H04L 45/16 370/217 |
| 2013/0343174 A1* | 12/2013 | Guichard | H04L 45/22 370/218 |
| 2014/0016457 A1* | 1/2014 | Enyedi | H04L 45/16 370/225 |
| 2014/0078887 A1* | 3/2014 | Yu | H04L 43/0811 370/219 |
| 2014/0294005 A1 | 10/2014 | Jain | |
| 2016/0072702 A1 | 3/2016 | Gao | |
| 2016/0191613 A1* | 6/2016 | Srinivasan | H04L 67/10 709/201 |
| 2018/0006995 A1 | 1/2018 | Bickhart | |
| 2018/0063731 A1* | 3/2018 | Ashrafi | H04W 76/15 |

\* cited by examiner

TWO-CHANNEL-BASED HIGH-AVAILABILITY

BACKGROUND

A high availability system is a system that is resilient to failures of the system's components. Typically, this is achieved by providing redundant components so that if one component fails, a redundant component can take over performing the tasks of the failed component.

HA devices, such as edge nodes, may be grouped into clusters. The nodes in a cluster may work as a team to provide services even if some of the nodes fail. As long as at least one of the nodes in a cluster remains active, the cluster may provide the services configured on the nodes. Examples of the services may include load balancing, traffic forwarding, data packet processing, VPN services, DNS services, and the like.

Nodes in a cluster may operate in either an active mode or a standby mode. If a node in a cluster fails, then, if possible, a surviving node assumes an active role and provides the services that were configured on the failed node.

Unfortunately, detecting failures of nodes in node clusters is often inefficient and difficult. Typically, HA nodes in a cluster communicate with each other via Bidirectional Forwarding Detection ("BFD") channels. However, since the BFD channel may be configured with an aggressive timer, relying on communications exchanged via the BFD channel may lead to false detections of failures. For example, when no response is received to three consecutive packets sent to a node, an aggressive timer may flag failure of the node even if the node is still healthy. This may happen because the BFD traffic is usually communicated alongside the user traffic over the same channel, and the responses from the nodes are lost due to congestion caused by a high-volume user traffic, not due to the node's failure. Nevertheless, failure to timely detect BFD control packets from the node may trigger failover even if the node is still healthy.

SUMMARY

Techniques are presented herein for providing HA support by a node cluster. The techniques provide two-channel-based HA that relies on communications exchanged via two channels established between hosts hosting the nodes of the cluster. The purpose of using two channels, instead of one, is to improve reliability of the HA support. For example, if one channel fails, then the system may rely on the information obtained via the second channel. The cluster may include a pair of edge nodes, one of which operates in an active mode and another in a standby mode.

In an embodiment, a pair of channels established between two hosts is configured to provide support for BFD-compliant communications. One of the channels is referred to as an underlay control channel (or an underlay channel), while another channel is referred to as a management control channel (or a management channel). The pair of channels may be implemented either between virtual network interface cards ("VNICs") of the hosts or between physical network interface cards ("PNICs") of the hosts.

If the pair of channels is implemented between VNICs, then the BFD control packets communicated via the channels are monitored by local control planes of the respective hosts. If the pair of channels are implemented between PNICs, then the BFD control packets communicated via the channels are monitored by local control planes of the operating system ("OS") of the hosts.

In an embodiment, local control planes monitor BFD control packets communicated via both an underlay channel and a management channel. The local control planes may, for example, extract diagnostic codes from the BFD control packets, and use the diagnostic codes to determine whether a neighbor node has failed. For example, if BFD control packets received via either channel indicate that the neighbor node has failed, then the services configured on the neighbor node may be switched over onto another node.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
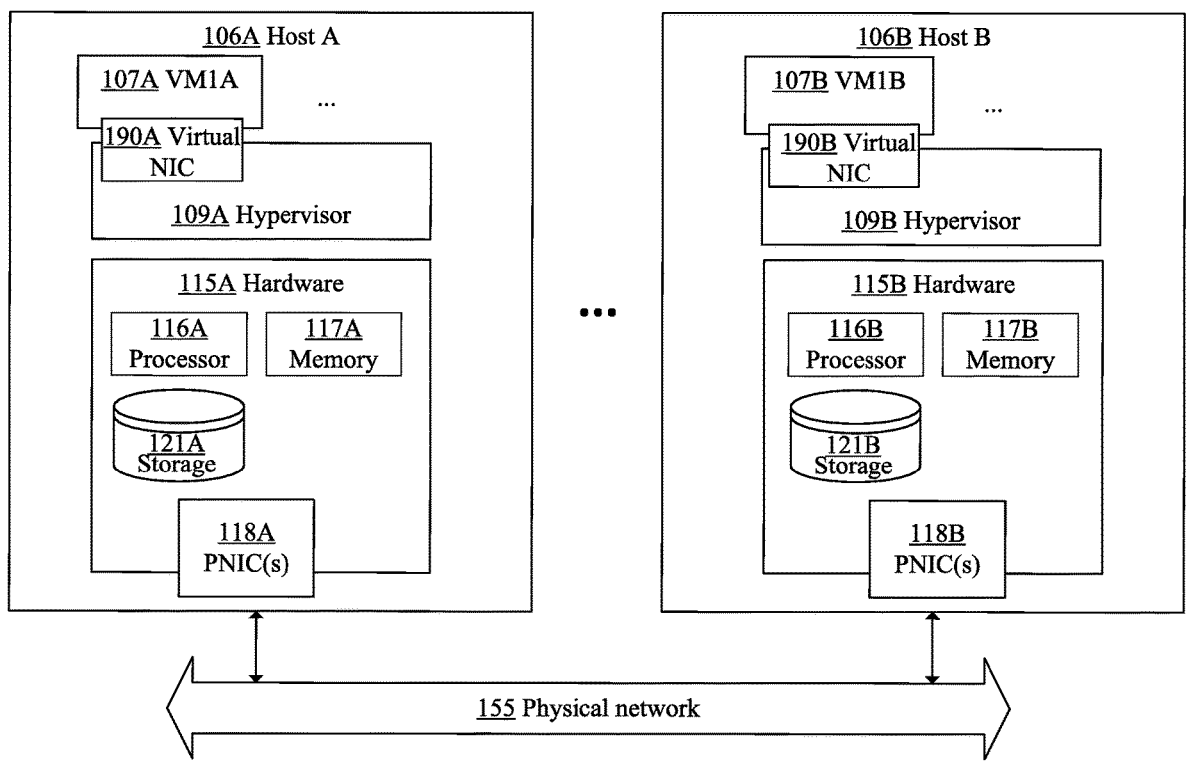
FIG. 1 is a block diagram depicting an example physical implementation view of an example logical network environment 10 for implementing two-channel-based HA for a cluster of nodes.

FIG. 1 is a block diagram depicting an example physical implementation view of an example logical network environment 10 for implementing two-channel-based HA for a cluster of nodes. In the depicted example, environment 10 includes two or more hosts 106A, 106B, and one or more physical networks 155.

Hosts 106A, 106B are used to implement logical routers, logical switches and virtual machines ("VMs"). Hosts 106A, 106B are also referred to as computing devices, host computers, host devices, physical servers, server systems or physical machines. Each host may be configured to support several VMs. In the example depicted in FIG. 1, host 106A is configured to support a VM 107A, while host 106B is configured to support a VM 107B. Additional VMs may also be supported by hosts 106A-106B.

Virtual machines 107A-107B are executed on hosts 106A, 106B, respectively, and are examples of virtualized computing instances or workloads. A virtualized computing instance may represent an addressable data compute node or an isolated user space instance. VMs 107A-107B may implement edge nodes, edge node gateways, and the like.

Hosts 106A, 106B may also be configured to support execution of hypervisors 109A and 109B, respectively.

Hypervisors 109A, 109B are software layers or components that support the execution of multiple VMs, such as VMs 107A-107B. Hypervisors 109A and 109B may be configured to implement virtual switches and forwarding tables that facilitate data traffic between VMs 107A-107B. In certain embodiments, virtual switches and other hypervisor components may reside in a privileged virtual machine (sometimes referred to as a "Domain Zero" or "the root partition") (not shown). Hypervisors 109A and 109B may also maintain mappings between underlying hardware 115A, 115B, respectively, and virtual resources allocated to the respective VMs.

Hardware component 115A may include one or more processors 116A, one or more memory units 117A, one or more PNICs 118A, and one or more storage devices 121A.

Hardware component 115B may include one or more processors 116B, one or more memory units 117B, one or more PNICs 118B, and one or more storage devices 121B.

Figure 2A:
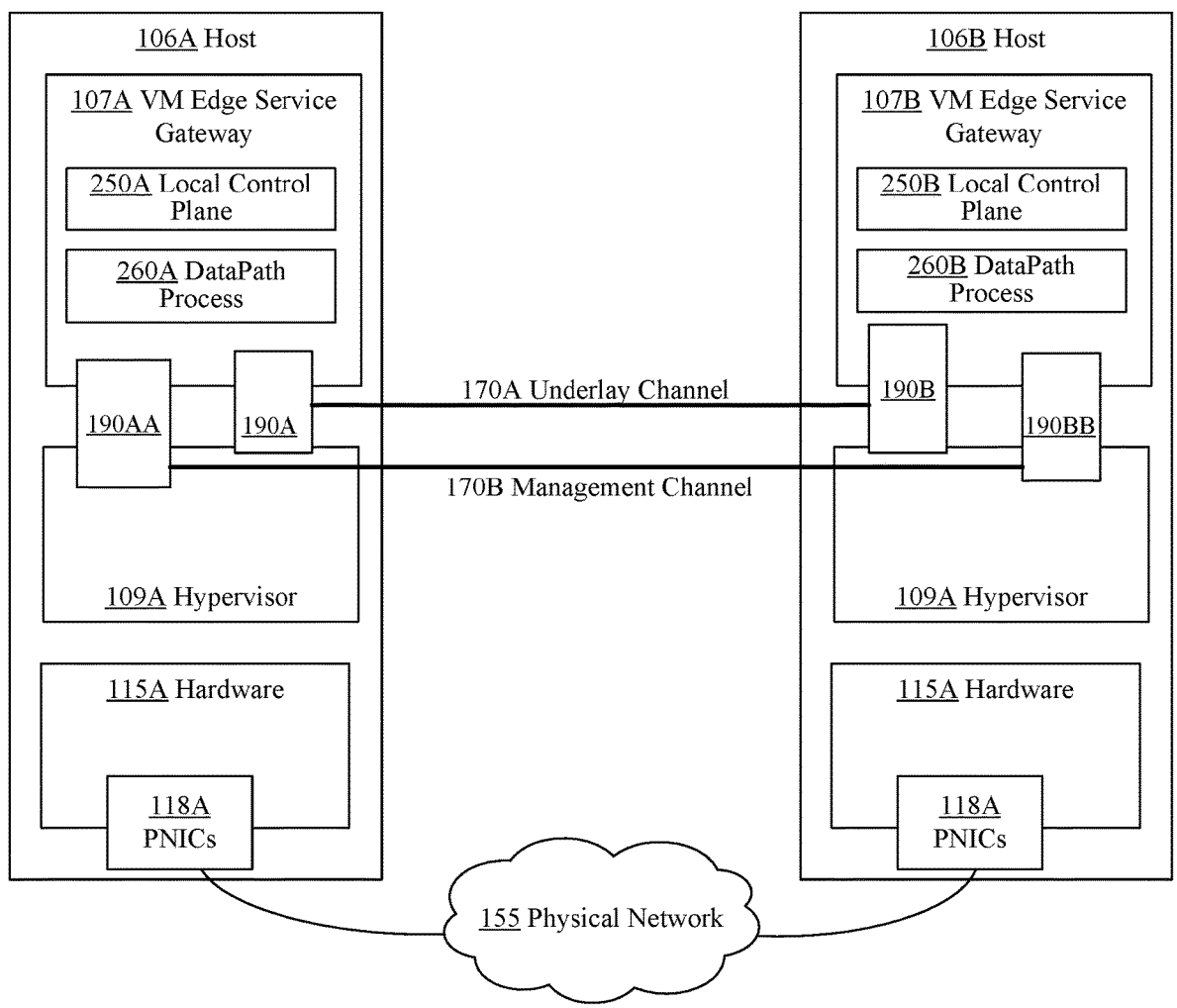
FIG. 2A is a block diagram depicting an example implementation of two-channel-based HA for a cluster of nodes.

2. Example Two-Channel High-Availability Configuration 2.1. Example VNIC-Based Configuration FIG. 2A is a block diagram depicting an example implementation of two-channel-based HA for a cluster of nodes. In the depicted example, hosts 106A-106B may be edge service gateways. Host 106A provides support for VNIC 190A and VNIC 190AA, while host 106B provides support for VNIC 190B and 190BB. VM 107A supports, among other things, a local control plane 250A and a data path process 260A. VM 107B supports, among other things, a local control plane 250B and a data path process 260B.

Hosts 106A-106B also provide support for execution of hypervisors 109A and 109B, respectively.

In the depicted example, hardware 115A includes, among other things, PNICs 118A, while hardware 115B includes, among other things, PNICs 118B.

In the depicted example, a two-channel-based HA for a cluster of nodes is implemented using a pair of 170A-170B channels: an underlay control channel 170A and a management control channel 170B.

In an embodiment, underlay control channel 170A is established between a VNIC 190A and a VNIC 190B, and it is a channel in an underlay network used to communicate overlay traffic. Management control channel 170B is established between VNIC 190AA and VNIC 190BB. Both channels 170A-170B may be used to provide two-channel-based HA for nodes, such as VMs 107A-107B. Both channels 170A-170B are used to communicate BFD control packets.

Local control plane 250A is configured to monitor both channels 170A-170B on VM 107A side, while local control plane 250B is configured to monitor both channels 170A-170B on VM 107B side. For example, local control plane 250A may monitor BFD control packets detected on interfaces configured for channels 170A-170B to determine whether VM 107B executing on host 106B has failed.

In an embodiment, to determine whether VM 107B executing on host 106B has failed, local control plane 250A implements the following rules: if no BFD control packets has been received via both channels 170A-170B from host 106B after a timeout, then local control plane 250A deduces that VM 107B is unreachable, and thus the services configured on VM 107B should be switched from VM 107B onto VM 107A. However, if a BFD control packet from at least one of channels 170A-170B from host 106B includes a diagnostic code indicating host 106B is down, then local control plane 250A deduces that VM 170B is down, and thus the services configured on VM 107B should be switched from VM 107B onto VM 107A. In other situations, local control plane 250A deduces that host 106B is up and so is VM 107B, and therefore, no switchover is needed at this time.

Two-channel-based HA may utilize diagnostic codes included in BFD control packets communicated via underlay control channel 170A and management control channel 170B. Diagnostic codes are described in detail in FIG. 5.

An example of a diagnostic code is a code "7," which indicates an "administrative down" of a node. Local control plane 250A implemented in VM 107A receives a BFD control packet with the diagnostic code "7" when VM 107B hosted on host 106B enters an administrative-down-state. If VM 107B enters an administrative-down-state, then BFD control packets with that code are most likely to be detected on interfaces of both channels, and therefore, upon receiving such BFD control packets, local control plane 250A may generate a message or a request to initiate failover.

However, in some situations, a local control plane may determine that diagnostic codes included in BFD-compliant control packets detected on interfaces of the two channels are different. In such situations, if any of channels 170A-170B communicated a BFD control message indicating that VM 107B is down, then, upon receiving such a BFD control packet, local control plane 250A deduces that VM 107B is indeed down, and thus local control plane 250A generates a message or a request to initiate failover.

In some situations, local control plane 250A awaits receiving a BFD control packets from each channel 170A-170B. If no BFD control packets is received from underlay control channel 170A (or management control channel 170B) after a timeout, then local control plane 250A deduces that either the channel is down or a corresponding VNIC is down. If local control plane 250A does not receive any BFD control packet from both channels 170A-170B after a timeout, then local control plane 250A may deduce that VM 107B is unreachable, and thus VM 107B is down. In this situation, local control plane 250A may generate a message or a request to initiate failover.

Functionalities of local control plane 250B mirror functionalities of local control plane 250B. More specifically, local control plane 250B may be configured to monitor both channels 170A-170B and based on BFD control packets detected on interfaces configured for channels 170A-170B on the side of host 106B, determine whether VM 107A executing on host 106A has failed.

2.2. Example PNIC-Based Configuration

Figure 2B:
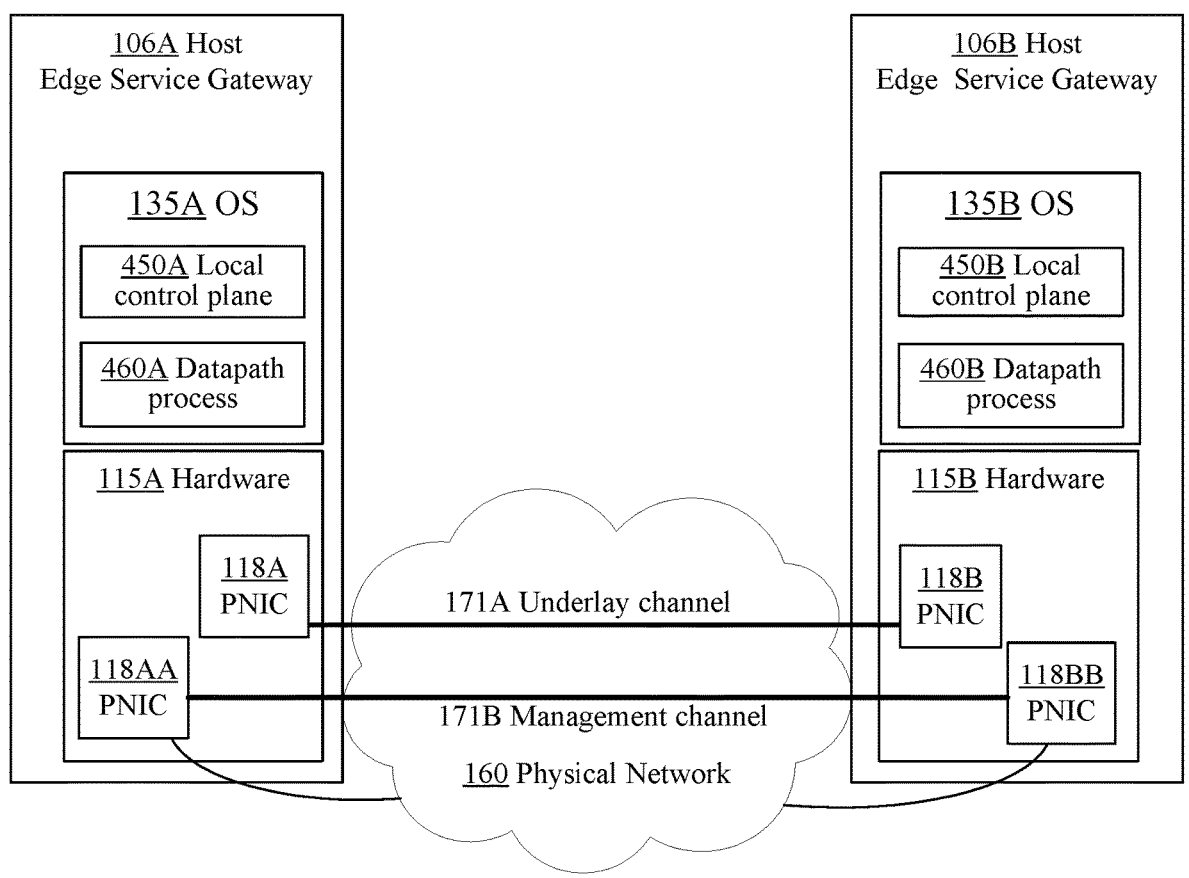
FIG. 2B is a block diagram depicting an example implementation of two-channel-based HA for a cluster of nodes.

FIG. 2B is a block diagram depicting an example implementation of two-channel-based HA for a cluster of nodes. In the depicted example, hosts 106A-106B are edge service gateways. OS module 135A on host 106A supports, among other things, a local control plane 450A and a data path process 460A, while OS module 135B on host 106B supports, among other things, a local control plane 450B and a data path process 460B.

In the depicted example, a two-channel-based HA for a cluster of nodes is implemented using a pair of 171A-171B channels: an underlay control channel 171A and a management control channel 171B.

In an embodiment, underlay control channel 171A is established between a PNIC 118A and a PNIC 118B, and it is a channel in an underlay network used to communicate overlay traffic. Management control channel 171B is established between PNIC 118AA and PNIC 118BB. Both channels 171A-171B may be used to provide two-channel-based HA for hosts 106A-106B. Both channels 171A-171B are used to communicate BFD control packets.

Local control plane 450A is configured to monitor both channels 171A-171B on host 106B side, while local control plane 450B is configured to monitor both channels 171A-171B on host 106B side. For example, local control plane 450A may monitor BFD control packets detected on interfaces configured for channels 171A-171B to determine whether host 106B has failed.

In an embodiment, to determine whether host 106B executing on host 106B has failed, local control plane 450A implements the following rules: if no BFD control packets have been received via channels 171A-171B from host 106B after a timeout, then local control plane 450A deduces that host 106B is unreachable, and thus the services configured on host 106B should be switched from host 106B onto host 106A. However, if a BFD control packet from at least one of channels 171A-171B from host 106B includes a diagnostic code indicating that host 106B is down, then local control plane 450A deduces that host 106B is down, and thus the services configured on host 106B should be switched from host 106B onto host 106A. In the remaining situations, local control plane 450A deduces that host 106B is up, and therefore, no switchover is needed at this time.

Two-channel-based HA may utilize diagnostic codes included in BFD control packets communicated via underlay control channel 171A and management control channel 171B. Diagnostic codes are described in detail in FIG. 5.

An example of a diagnostic code is a code "7," which indicates an "administrative down" of a node. Local control plane 450A implemented in an OS module 135A receives a BFD control packet with the diagnostic code "7" when host 106B enters an administrative-down-state. If host 106B enters an administrative-down-state, then BFD control packets with that code are most likely to be detected on interfaces of both channels. Therefore, upon receiving such a BFD control packets, local control plane 450A may generate a message or a request to initiate failover.

However, in some situations, local control plane 450A may determine that diagnostic codes included in BFD-compliant control packets detected on interfaces of the two channels are different. In such situations, if any of channels 171A-171B communicated a BFD control message indicating that host 106B is down, then, upon receiving such a BFD control message, local control plane 450A deduces that host 106B is indeed down, and thus local control plane 450A generates a message or a request to initiate failover.

In some situations, local control plane 450A awaits receiving a BFD control packet from each channel 171A-171B. If no BFD control packets is received from underlay control channel 171A (or management control channel 171B) after a timeout, then local control plane 450A deduces that either the channel is down, or a corresponding host is down. If local control plane 450A does not receive any BFD control packet from both channels 171A-171B before a timeout, then local control plane 450A may deduce that host 106B is unreachable. In this situation, local control plane 450A may generate a message or a request to initiate failover.

Functionalities of local control plane 450B mirror functionalities of local control plane 450B. More specifically, local control plane 450B may be configured to monitor both channels 171A-171B and based on BFD control packets detected on interfaces configured for channels 171A-171B on the side of host 106B, determine whether host 106A has failed.

3. Example Two-Channel High-Availability Configuration

Figure 3:
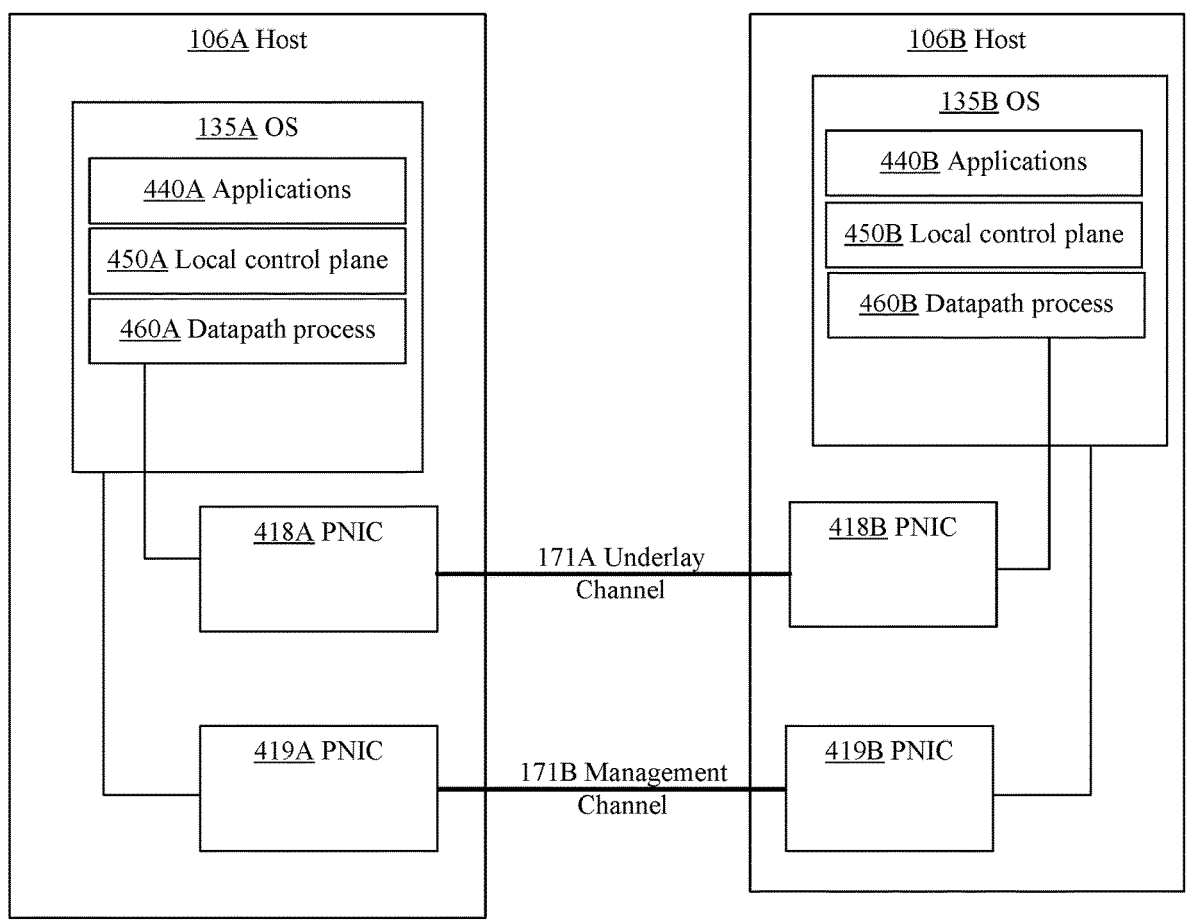
FIG. 3 is a block diagram depicting an example implementation of two-channel-based HA in physical network interface cards of hosts.

FIG. 3 is a block diagram depicting an example implementation of two-channel-based HA in physical network interface cards of hosts.

In the depicted example, a PNIC 418A is configured in hardware 115A, while a PNIC 418B is configured in hardware 115B. Furthermore, a PNIC 419A is configured in hardware 115A, while a PNIC 419B is configured in hardware 115B.

Moreover, underlay control channel 171A is established between PNIC 418A and PNIC 418B, while management control channel 171B is established between PNIC 419A and PNIC 419B.

Depending on status of data path process 460B, local control plane 450B may determine a diagnostic code for data path process 460B. Furthermore, local control plane 450B may encapsulate the diagnostic code in a BFD control packet and copy the BFD control packet on the interface of both underlay control channel 171A and management control channel 171B.

Subsequently, local control plane 450A may detect the BFD control packet with the diagnostic code on the interface of either underlay control channel 171A or management control channel 171B, and analyze the diagnostic code. If the code is for example, a diagnostic code "6", then local control plane 450A may determine that a concatenated path to host 106B is down, and thus temporarily unavailable. Subsequently, local control plane 450A may generate a message to initiate failover of services configured on host 106B onto host 106A.

Similarly, depending on status of data path process 460A, local control plane 450A may determine a diagnostic code for data path process 460A. Furthermore, local control plane 450A may encapsulate the diagnostic code in a BFD control packet and copy the BFD control packet on the interface of both underlay channel 171A and management channel 171B.

Subsequently, local control plane 450B may detect the BFD control packet with the diagnostic code on the interface of underlay channel 171A or management channel 171B and analyze the diagnostic code. If the code is for example, a diagnostic code "6", then local control plane 450B may determine that a concatenated path to host 106A is down, and thus temporarily unavailable. Subsequently, local control plane 450B may generate a message to initiate failover of services configured on host 106A onto host 106B.

4. Example Workflow

In an embodiment, a two-channel-based HA approach is implemented between any two entities of a HA cluster. For example, if a cluster includes two edge service gateways, then local control planes implemented in the edge service gateways cooperate with each other to determine whether any of the two edge service gateways has failed. The local control planes may for example, exchange BFD control packets via an underlay control channel and a management control channel. The BFD control packets exchanged via the channels may be generated based on different information available to the local control channels. Based on the exchanged information, the local control channels determine whether the edge service gateways are down.

In an embodiment, hosts hosting nodes of an HA cluster may establish their underlay control channels and management control channels at a VNIC-level or at a PNIC level.

Figure 4A:
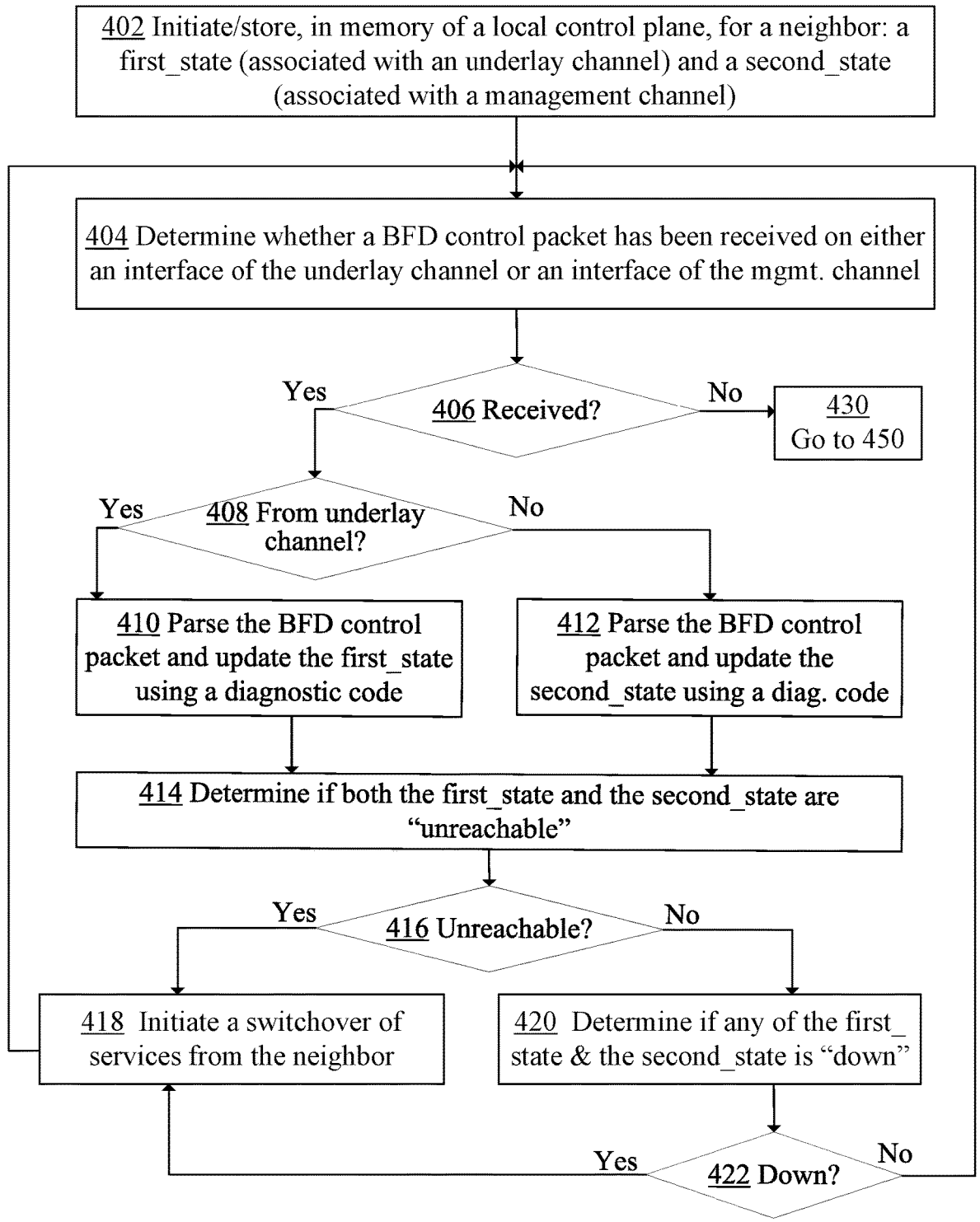
FIG. 4A is an example flow chart for implementing a two-channel-based high-availability approach.

FIG. 4A is an example flow chart for implementing a two-channel high-availability approach. In the depicted example, it is assumed that a cluster comprises two edge service gateways, each hosted on a different host, and that an underlay control channel and a management control channel are established between either corresponding VNICs or PNICs. The channels are configured to facilitate BFD-compliant communications.

In step 402, a local control plane executing on a first node initiates and stores, in memory of the local control plane, for a neighbor node the following: a first state (associated with an underlay control channel) and a second state (associated with a management control channel).

In step 404, the local control plane determines whether a BFD control packet has been received on either an interface of the underlay control channel or an interface of the management control channel. An example of the BFD control packet is described in FIG. 5.

In step 406, the local control plane tests if such a BFD control packet has been received. If it has been, then the local control plane proceeds to performing step 408; otherwise, the local control plane proceeds to performing step 430.

In step 408, the local control plane determines whether the received BFD control packet was received via the underlay control channel. If it was, then the local control plane proceeds to performing step 410; otherwise, the local control plane proceeds to performing step 412.

In step 410, the local control plane parses a mandatory section of the detected BFD control packet to determine whether any of certain diagnostic codes are set in the mandatory section. The certain diagnostic codes may include selected subset of diagnostic codes 0-31 described in FIG. 5. The subset may include for example, a diagnostic code "6" that indicates that a concatenated path to the second node is down, and a diagnostic code "7" that indicates that the second node entered a maintenance mode, and thus became unavailable. The subset may also include other diagnostic codes described in FIG. 5.

Also, in this step, the local control plane updates the first state using the diagnostic code.

In step 414, the local control plane determines whether both the first state and the second state indicate that the neighbor node is unreachable.

If the local control plane determines, in step 416, that the neighboring node is unreachable, then the local control place proceeds to performing step 418; otherwise, the local control plane proceeds to performing step 420.

In step 418, the local control plane initiates a switchover of services from the neighbor node onto the node on which the local control plane is executed. Then, the local control plane proceeds to step 404.

In step 420, the local control plane determines whether any of the first state and the second state indicates that the neighboring node is down.

If the local control plane determined, in step 422, that the neighboring node is down, then the local control plane proceeds to step 418; otherwise, the local control plane proceeds to performing step 404.

In step 412, the local control plane parses the detected BFD control packet, extracts a diagnostic code from the packet, and uses the diagnostic code to update the second state. Then the local control plane proceeds to performing step 414, described above.

Figure 4B:
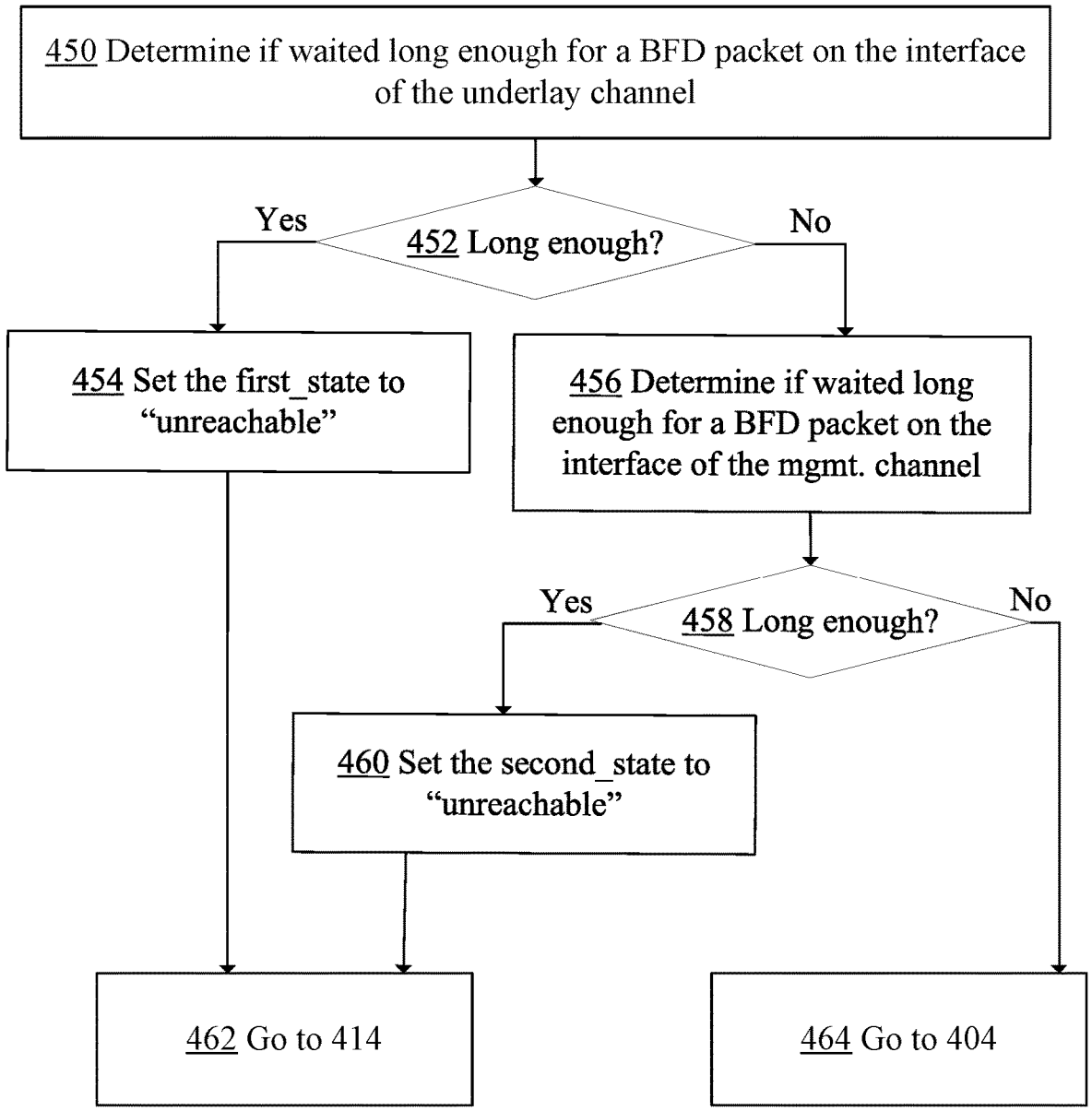
FIG. 4B is an example flow chart for implementing a two-channel-based high-availability approach.

In step 430, the local control plane proceeds to performing step 450, described in FIG. 4B.

FIG. 4B is an example flow chart for implementing a two-channel high-availability approach.

In step 450, the local control plane determines if a timeout for waiting for a BFD control message from the underlay control channel has expired.

If the local control plane determined, in step 452, that the timeout has expired, then the local control plane proceeds to performing step 454; otherwise, the local control plane proceeds to performing step 456.

In step 454, the local control plane sets the first state to indicate that the neighboring node is unreachable.

In step 462, the local control plane proceeds to performing step 414.

In step 456, the local control plane determines if a timeout for waiting for a BFD control message from the management control channels has expired.

If the local control plane determined, in step 458, that the timeout has expired, then the local control plane proceeds to performing step 460, described above; otherwise, the local control channel proceeds to performing step 464.

In step 464, the local control plane proceeds to performing step 404, described in FIG. 4A.

The process described in FIG. 4A-4B may be repeated for each type of diagnostic codes that the local control plane has implemented. The process may also be repeated for each node in a cluster with which the first node is able to establish both an underlay control channel and a management control channel.

5. Example Diagnostic Codes Used in Two-Channel-Based Ha Approach

Figure 5:
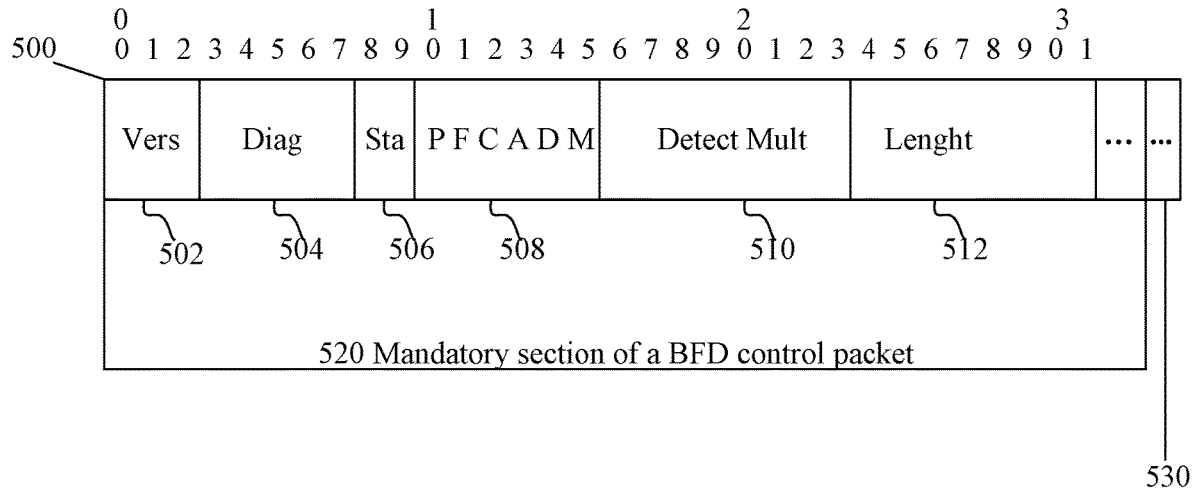
FIG. 5 is a block diagram depicting an example mandatory section of an example of a generic BFD control packet.

FIG. 5 is a block diagram depicting an example mandatory section 520 of an example of a generic BFD control packet 500. Generic BFD control packet 500 has a mandatory section 520, and an optional authentication section 530. If authentication section 530 is present, then the format of authentication section 530 depends on the type of authentication in use. Authentication section 530 is outside of the scope of this disclosure.

Mandatory section 520 of BFD control packet 500 includes a version field 502, a diagnostic field 504, a state field 506, a P-F-C-A-D-M flag field 508, a detection time multiplier field 510, a BFD control packet length field 512, and other fields. Diagnostic field 504 is relevant for this disclosure, and therefore it is described in detail below.

Diagnostic field 504 includes five bits, and the bits are used to encode diagnostic codes. In an embodiment, the diagnostic codes include: 0—no diagnostic, 1—control detection time expired, 2—echo function failed, 3—neighbor signaled session down, 4—forwarding plane reset, 5—path down, 6—concatenated path down, 7—administratively down, 8—reverse concatenated path down, 9-31—reserved for future use.

In an embodiment, a diagnostic code "6" and a diagnostic code "7" are used in a two-channel-based HA approach. A local control plane, or an entity detecting a problem with a node, sends a BFD control packet with a diagnostic code "6" set if a northbound routing goes down, and thus a concatenated path to, or via, the node is down. A local control plane, or an entity detecting a problem with the node, sends a BFD control packet with a diagnostic node "7" set if the node enters for example a maintenance mode, and the node is down by an administrator.

In an embodiment, other diagnostic codes, such as some codes of the reserved 9-31 codes, may be used in implementing a two-channel-based HA approach.

Diagnostic codes included in BFD control packets may be used to determine state of a node. In a mapping 550, a diagnostic code "0" indicates that a node is operational, while diagnostic codes "6"-"7" indicate that a node is down. If no BFD control message is received on both channels before a timeout, then a node is considered to be unreachable.

6. Improvements Provided by Certain Embodiments

In an embodiment, an approach provides mechanisms for a two-channel-based HA in a cluster of nodes for detecting failures of nodes efficiently and reliably. The approach allows reducing, if not eliminating, false detections of node failures, and unnecessary failovers in the clusters.

In an embodiment, two-channel-based HA relies on communications exchanged via two channels established between hosts hosting nodes of a cluster. The two channels provide support for the BFD-based communications. Local control planes implemented in the hosts hosting the nodes monitor BFD control packets exchanged via both channels. The BFD control packets may include diagnostic codes that indicate status or problems with the nodes. Based on the diagnostic codes, the local control planes may determine whether failover is necessary.

7. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

8. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for providing two-channel-based high-availability in a node cluster, the method comprising:
   initiating, by a local control plane executing on a first node, a first state for an underlay control channel and a second state for a management control channel;
   detecting, by the local control plane, a bidirectional forwarding detection ("BFD") control packet from a second node;
   determining, by the local control plane, whether the BFD control packet has been received from the underlay control channel;
   in response to determining that the BFD control packet was received from the underlay control channel:
      parsing, by the local control plane, the BFD control packet to extract a first diagnostic code;
      updating the first state with the first diagnostic code;
      determining whether both the first state and the second state indicate that the second node is unreachable; and
      in response to determining that both the first state and the second state indicate that the second node is unreachable, initiating a switchover of services configured on the second node.

2. The method of claim 1, further comprising:
   in response to determining that the BFD control packet was not received from the underlay control channel:
      determining, by the local control plane, whether the BFD control packet has been received from the management control channel;
      in response to determining that the BFD control packet was received from the management control channel:
         parsing, by the local control plane, the BFD control packet to extract a second diagnostic code;
         updating the second state with the second diagnostic code;
         determining whether both the first state and the second state indicate that the second node is unreachable; and in response to determining that both the first state and the second state indicate that the second node is unreachable, initiating a switchover of services configured on the second node.

3. The method of claim 2, further comprising:
in response to determining that both the first state and the second state do not indicate that the second node is unreachable:
  determining whether any of the first state and the second state indicates that the second node is down:
  in response to determining that any of the first state and the second state indicates that the second node is down, initiating a switchover of services configured on the second node.

4. The method of claim 3, further comprising:
in response to determining that no BFD control packet has been received from the underlay control channel before a timeout, update the first state to indicate that the second node is unreachable.

5. The method of claim 4, further comprising:
in response to determining that no BFD control packet has been received from the management control channel before a timeout, update the second state to indicate that the second node is unreachable.

6. The method of claim 5, wherein the underlay control channel is established between a first virtual network interface card ("VNIC") configured on the first node and a first VNIC configured on the second node; and wherein a management control channel established between a second VNIC configured on the first node and a second VNIC configured on the second node.

7. The method of claim 6, wherein the underlay control channel is established between a first physical network interface card ("PNIC") configured on the first node and a first PNIC configured on the second node; and wherein the management control channel established between a second PNIC configured on the first node and a second PNIC configured on the second node.

8. One or more non-transitory computer-readable storage media storing one or more computer instructions which, when executed by one or more processors, cause the one or more processors to provide two-channel-based high-availability in a node cluster, and to perform:
  initiating, by a local control plane executing on a first node, a first state for an underlay control channel and a second state for a management control channel;
  detecting, by the local control plane, a bidirectional forwarding detection ("BFD") control packet from a second node;
  determining, by the local control plane, whether the BFD control packet has been received from the underlay control channel;
  in response to determining that the BFD control packet was received from the underlay control channel:
    parsing, by the local control plane, the BFD control packet to extract a first diagnostic code;
    updating the first state with the first diagnostic code;
    determining whether both the first state and the second state indicate that the second node is unreachable; and
    in response to determining that both the first state and the second state indicate that the second node is unreachable, initiating a switchover of services configured on the second node.

9. The one or more non-transitory computer-readable storage media of claim 8, comprising additional instructions which, when executed by the one or more processors, cause the one or more processors to perform:
  in response to determining that the BFD control packet was not received from the underlay control channel:
    determining, by the local control plane, whether the BFD control packet has been received from the management control channel;
    in response to determining that the BFD control packet was received from the management control channel:
      parsing, by the local control plane, the BFD control packet to extract a second diagnostic code;
      updating the second state with the second diagnostic code;
      determining whether both the first state and the second state indicate that the second node is unreachable; and
      in response to determining that both the first state and the second state indicate that the second node is unreachable, initiating a switchover of services configured on the second node.

10. The one or more non-transitory computer-readable storage media of claim 9, comprising additional instructions which, when executed by the one or more processors, cause the one or more processors to perform:
  in response to determining that both the first state and the second state do not indicate that the second node is unreachable:
    determining whether any of the first state and the second state indicates that the second node is down:
    in response to determining that any of the first state and the second state indicates that the second node is down, initiating a switchover of services configured on the second node.

11. The one or more non-transitory computer-readable storage media of claim 10, comprising additional instructions which, when executed by the one or more processors, cause the one or more processors to perform:
  in response to determining that no BFD control packet has been received from the underlay control channel before a timeout, update the first state to indicate that the second node is unreachable.

12. The one or more non-transitory computer-readable storage media of claim 11, comprising additional instructions which, when executed by the one or more processors, cause the one or more processors to perform:
  in response to determining that no BFD control packet has been received from the management control channel before a timeout, update the second state to indicate that the second node is unreachable.

13. The one or more non-transitory computer-readable storage media of claim 12, wherein the underlay control channel is established between a first virtual network interface card ("VNIC") configured on the first node and a first VNIC configured on the second node; and wherein a management control channel established between a second VNIC configured on the first node and a second VNIC configured on the second node.

14. The one or more non-transitory computer-readable storage media of claim 13, wherein the underlay control channel is established between a first physical network interface card ("PNIC") configured on the first node and a first PNIC configured on the second node; and wherein the management control channel established between a second PNIC configured on the first node and a second PNIC configured on the second node.

15. A local control plane implemented in a host computer and configured to provide two-channel-based high availability in a node cluster, the local control plane comprising:
one or more processors;
one or more memory units; and
one or more non-transitory computer-readable storage media storing one or more computer instructions which, when executed by the one or more processors, cause the one or more processors to perform:
initiating, by a local control plane executing on a first node, a first state for an underlay control channel and a second state for a management control channel;
detecting, by the local control plane, a bidirectional forwarding detection ("BFD") control packet from a second node;
determining, by the local control plane, whether the BFD control packet has been received from the underlay control channel;
in response to determining that the BFD control packet was received from the underlay control channel:
parsing, by the local control plane, the BFD control packet to extract a first diagnostic code;
updating the first state with the first diagnostic code;
determining whether both the first state and the second state indicate that the second node is unreachable; and
in response to determining that both the first state and the second state indicate that the second node is unreachable, initiating a switchover of services configured on the second node.

16. The local control plane of claim 15, storing additional instructions which, when executed by the one or more processes, cause the one or more processors to perform:
in response to determining that the BFD control packet was not received from the underlay control channel:
determining, by the local control plane, whether the BFD control packet has been received from the management control channel;
in response to determining that the BFD control packet was received from the management control channel:
parsing, by the local control plane, the BFD control packet to extract a second diagnostic code;
updating the second state with the second diagnostic code;
determining whether both the first state and the second state indicate that the second node is unreachable; and
in response to determining that both the first state and the second state indicate that the second node is unreachable, initiating a switchover of services configured on the second node.

17. The local control plane of claim 16, storing additional instructions which, when executed by the one or more processes, cause the one or more processors to perform:
in response to determining that both the first state and the second state do not indicate that the second node is unreachable:
determining whether any of the first state and the second state indicates that the second node is down:
in response to determining that any of the first state and the second state indicates that the second node is down, initiating a switchover of services configured on the second node.

18. The local control plane of claim 17, storing additional instructions which, when executed by the one or more processes, cause the one or more processors to perform:
in response to determining that no BFD control packet has been received from the underlay control channel before a timeout, update the first state to indicate that the second node is unreachable.

19. The local control plane of claim 18, storing additional instructions which, when executed by the one or more processes, cause the one or more processors to perform:
in response to determining that no BFD control packet has been received from the management control channel before a timeout, update the second state to indicate that the second node is unreachable.

20. The local control plane of claim 19, wherein the underlay control channel is established between a first virtual network interface card ("VNIC") configured on the first node and a first VNIC configured on the second node; and wherein a management control channel established between a second VNIC configured on the first node and a second VNIC configured on the second node.

* * * * *